April 9, 1935.   C. L. SNYDER ET AL   1,996,839

JACKING CLAMP

Filed April 7, 1934

Inventors
Clifford L. Snyder &
Charles E. Proctor

By Blackmore, Spencer & Fink
Attorneys

Patented Apr. 9, 1935

1,996,839

UNITED STATES PATENT OFFICE 1,996,839

JACKING CLAMP

Clifford L. Snyder and Charles E. Proctor, Detroit, Mich., assignors to General Motors Corporation, Detroit, Mich., a corporation of Delaware Application April 7, 1934, Serial No. 719,473

3 Claims. (Cl. 280—150)

This invention relates to a jacking clamp for use on automotive vehicles having independently sprung wheels.

In the independently sprung wheels used on present day cars which utilize a totally inclosed helical spring as disclosed in Automotive Industries of January 6, 1934, pages 11-13 and 22-24 and 27, and in Motor (U. S.) January 1934, page 244, some difficulty has been experienced in jacking up or raising the vehicle when the tire is deflated. If a jack is placed directly under the cross member beneath the chassis frame, known as the king pin support, and the jack operated to raise the vehicle, the springs in the housing mounted on the king pin will cause the wheel and tire to move downwardly until the limit of expansion of the springs has been reached. This will necessitate the vehicle being raised to a height considerably above the normal and has necessitated the use of a jack which will raise the vehicle to an unusually high distance. If the jack be placed under the swinging arms attached to the wheel, the initial upward movement of the jack will cause the compression of the springs and this compression will continue until the limit of compression is reached. This will not raise the wheel but will permit the chassis frame to lower so that there is no raising of the wheel until the limit of compression of the springs has been reached. This will also necessitate a jack which gives an unusually high lift.

It is the object of the present invention to devise a means whereby the ordinary jack will be used and excessive raising of the vehicle will not be necessary. Accordingly there has been devised a jacking clamp which is adapted to engage both the housing for the vehicle springs and the links which extend from the housing to the wheel so that the housing and links will be rigidly held when a jack is applied to any appropriate part of the vehicle frame. This jacking clamp may be of any suitable form and three specific forms have been shown on the drawing.

On the drawing

Figure 1:
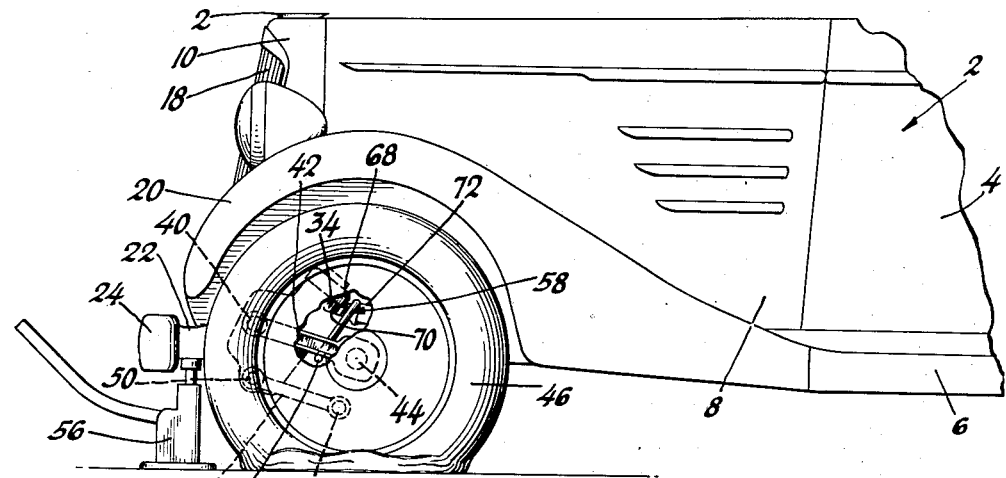
Figure 1 is a side elevational view of the front end of a motor vehicle showing the tire deflated and parts broken away to illustrate the application of the jacking clamp.

Referring to the drawing, the numeral 2 indicates an automotive vehicle as a whole. The vehicle has the front door 4, the running board 6, the hood 8, radiator shell 10, filler cap 12, grille 18, and fender 20. These parts are mounted on the chassis frame 22 supplied with the usual bumper 24. Secured at 25 beneath the chassis frame 22 is the cross member 26 having the yoke 28 at its end to support king pin 30. The member 26 is known as the king pin support. Pivoted between the yoke 28 and supported by the king pin 30 is the arm 32 having the housing 34 formed integral therewith. The mechanism in the interior of the housing and the manner in which it operates is explained in the publications referred to in the statement of invention. A cap 36 having a reduced end 38 closes the upper portion of the housing.

A shaft 40 is pivoted in the housing and has rigidly secured thereto the link 42 having at its end a stub axle 44 on which the front wheel 46 is mounted. A second or reaction link 48 is pivoted at one end to a stud or knob 50 on the housing 34 and its other end 52 is pivoted as at 54 to a portion of the wheel 46. The parts so far described are the conventional construction used.

When the tire is deflated as shown in Figure 1, if the jack 56 is placed under the king pin support 26 to raise the vehicle the springs in the housing 34 will cause the link 42 to swing and move the wheel downwardly until the limit of expansion is reached. This distance is sufficient to cause some annoyance when endeavoring to raise the vehicle to replace the tire. A similar situation occurs if the jack is placed under the links 42 or 48, when the jack is now raised it will cause the springs in the housing 34 to be compressed until the limit of compression is reached. Until this limit is reached, the wheel 46 will not be raised but the chassis will descend and both will be raised when the springs are completely compressed only. Accordingly, in both cases, there will be a movement of the jack for which there is no raising of the vehicle.

To obviate both of these inconveniences the jacking clamp of the invention has been devised. This clamp is shown at 58 in Figure 2. The clamp comprises the shank portion 60 and the short angularly bent end 62. The other end of the clamp 58 is V-shaped as indicated at 64 with an end 66 forming a continuation of the V and extending substantially parallel to the shank 58. A plate or bracing member 68 is welded to the shank 60 and the end 66.

The manner in which the clamp 58 is applied is shown in Figure 1. The end 62 is passed between the link 42 and the side of the housing 34 and then turned so that the end 62 is under the link 42. The plate 68 will then rest upon the top portion 70 of the arm 32. If the jack is now applied to the king pin support 26 or the chassis, the clamp 58 will prevent the wheel from dropping because the end 62 is beneath the link 42. The ordinary vehicle jack may therefore be used and it will be necessary to raise the vehicle through the usual distance only in order that the tire may be replaced.

The purpose of the brace 68 is to prevent the upper or V-shaped portion 64 of the clamp from striking against the needle bearing 72 at the upper portion of the king pin 30. The thrust will be taken directly on the plate 68 while the bearing 72 will be received in the space between the end 66 and the shank 60.

Figure 2:
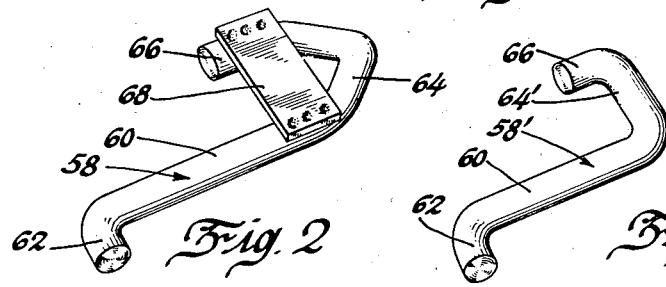
Figure 2 is a perspective view of one form of jacking clamp.
Figure 3:
Figures 3 and 4 are perspective views of other forms of jacking clamps.

The clamp 58' in Figure 3 is the same as the clamp in Figure 2 except that no brace 68 is used and the end 64' is straight instead of being V-shaped. The same shank 60 and ends 62 and 66 are used. The clamp in Figure 3 will have the part 64' received on the part 70 when the clamp is in position.

Figure 5:
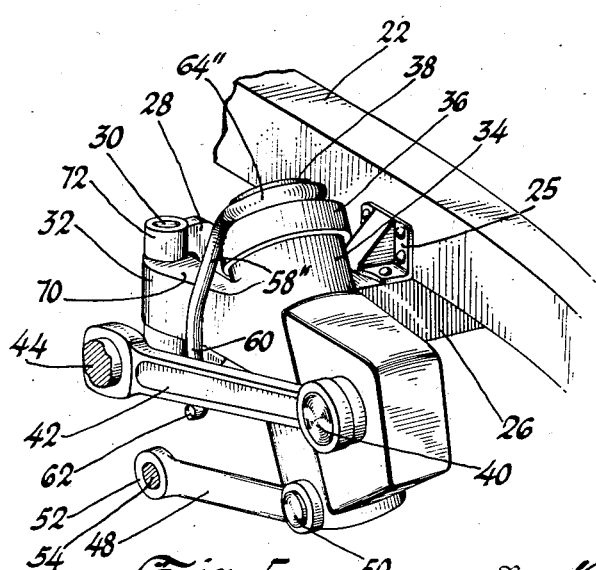
Figure 5 is a perspective view with the wheel broken away showing the application of the species of Figure 4.
Figure 4:
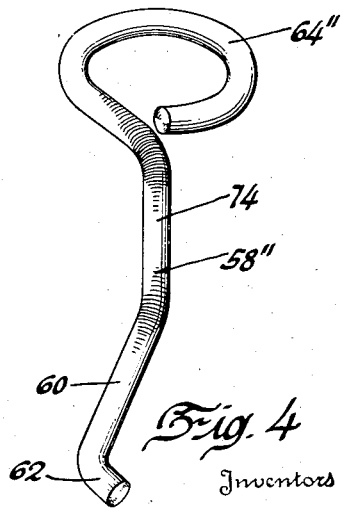

In Figure 5 the shank 60 and end 62 are the same. The upper portion of the clamp 58'' has the loop 64'' formed at the end of an angular portion 74. The loop 64'' is adapted to engage over the reduced end 38 of the cap 36 which closes the housing 34. The clamp of Figure 5 takes more metal or stock than the clamps of either of the other species, but will work just as well.

We claim:

1. In a jacking clamp adapted to interconnect an independently sprung wheel to the chassis of a vehicle, a shank portion, a V-shaped return bend in one end, a bar secured from the spaced end to the shank and a short angled end on the opposite extremity of the shank and extending in the opposite direction therefrom from the V-shaped bend.

2. A jacking clamp adapted to interconnect an independently sprung wheel to the chassis of a vehicle using a totally inclosed unit supported on a cross member by a needle bearing and king pin comprising a shank portion, a V-shaped return bend on one end, a cross member secured from the shank to the spaced end, and an angle on the opposite end of the shank whereby when the cross member seats on the top of the unit inclosure the V-shaped end will be over the needle bearing but spaced therefrom so that there will be no additional strain thereon.

3. A jacking clamp adapted to interconnect the wheel supporting link to the chassis in an independently sprung wheel suspension using a totally inclosed unit supported on a cross member by a needle bearing comprising a straight shank portion, an angular return bent portion on one end of the shank, a cross member secured from the shank to the spaced end, an angle end on the opposite extremity of the shank whereby when the clamp is in position the cross member rests upon the top of the unit inclosure, the angle adjacent it arches over the needle bearing and the opposite angle end engages the supporting link to hold it during the jacking operation.

CLIFFORD L. SNYDER.
CHARLES E. PROCTOR.